US009307131B1

(12) United States Patent
Breen (10) Patent No.: US 9,307,131 B1
(45) Date of Patent: Apr. 5, 2016

(54) DISPLAY SYSTEM USING MOUNTABLE TABLET ENCLOSURE (71) Applicant: Damien Breen, Hollywood, CA (US)

(72) Inventor: Damien Breen, Hollywood, CA (US)

( * ) Notice: Subject to any disclaimer, the term of this patent is extended or adjusted under 35 U.S.C. 154(b) by 8 days.

(21) Appl. No.: 14/451,521

(22) Filed: Aug. 5, 2014

Related U.S. Application Data (60) Provisional application No. 61/866,994, filed on Aug. 16, 2013.

(51) Int. Cl.
*G06F 1/16* (2006.01)
*H04N 5/225* (2006.01)
*G06F 1/18* (2006.01)

(52) U.S. Cl.
CPC ............ *H04N 5/2257* (2013.01); *G06F 1/1626* (2013.01); *G06F 1/1635* (2013.01); *G06F 1/1686* (2013.01); *G06F 1/182* (2013.01)

(58) Field of Classification Search
CPC .... G06F 1/1626; G06F 1/1628; G06F 1/1633
See application file for complete search history.

(56) References Cited

U.S. PATENT DOCUMENTS

| | | | |
|---|---|---|---|
| 1,402,483 A * | 1/1922 | Evans ................. | A47B 23/004 248/460 |
| 5,631,805 A | 5/1997 | Bonsall | |
| 5,636,101 A | 6/1997 | Bonsall et al. | |
| 5,903,869 A * | 5/1999 | Jacobson ............. | A47G 29/122 248/205.3 |
| 6,557,284 B2 * | 5/2003 | Nolan ..................... | G09F 13/04 40/574 |
| 7,092,248 B2 * | 8/2006 | Shu ........................ | G06F 1/1601 312/223.1 |
| 7,159,053 B1 | 1/2007 | Lakin | |
| 7,272,861 B2 | 9/2007 | Colletti et al. | |
| 7,907,394 B2 | 3/2011 | Richardson et al. | |
| 8,213,168 B2 | 7/2012 | McClure et al. | |
| 8,299,373 B2 * | 10/2012 | Shaw ..................... | G06F 1/1626 174/535 |
| 8,310,824 B2 * | 11/2012 | Dunn ....................... | H04N 5/64 312/223.1 |
| 8,345,410 B2 | 1/2013 | Ternus et al. | |
| D676,448 S * | 2/2013 | Gorman ........................ | D14/440 |
| 8,417,298 B2 | 4/2013 | Mittleman et al. | |
| 8,453,835 B2 * | 6/2013 | So ............................ | A45C 11/00 206/305 |
| 8,474,778 B2 * | 7/2013 | Jacobson ............. | F16M 11/041 248/206.2 |
| 8,542,495 B1 * | 9/2013 | Gorman ................ | G06F 1/1626 361/679.02 |
| 8,800,764 B2 * | 8/2014 | Wu .......................... | A45C 11/00 206/320 |
| 8,827,222 B2 * | 9/2014 | Jacobson ................ | F16M 13/02 248/205.5 |
| 8,870,137 B2 * | 10/2014 | Jacobson ............. | F16M 13/022 248/222.51 |
| 2010/0012600 A1 | 1/2010 | Clontz et al. | |
| 2011/0164365 A1 | 7/2011 | McClure et al. | |
| 2011/0211309 A1 | 9/2011 | Gandhi | |
| 2011/0215685 A1 | 9/2011 | Jarvis et al. | |
| 2012/0194997 A1 | 8/2012 | McClure et al. | |
| 2013/0027849 A1 * | 1/2013 | Berumen ............... | A45C 11/00 361/679.01 |
| 2013/0193758 A1 * | 8/2013 | Liverance ............. | G06F 1/1635 307/48 |
| 2013/0240693 A1 * | 9/2013 | Jacobson ............... | F16M 13/02 248/205.8 |
| 2013/0322013 A1 * | 12/2013 | Steele ..................... | A45C 11/00 361/679.55 |
| 2014/0054338 A1 * | 2/2014 | Casagrande ........... | B60R 11/02 224/275 |
| 2014/0124556 A1 * | 5/2014 | Jiang ....................... | B60R 11/02 224/559 |

(Continued)

Primary Examiner — Anthony Q Edwards
(74) Attorney, Agent, or Firm — Joseph G. Swan, P.C.

(57) ABSTRACT

Provided are, among other things, systems, methods and techniques for displaying content. One representative embodiment involves (a) an enclosure apparatus having a front face that includes a see-through portion and an attachment surface; and (b) a tablet computing device that (i) has a display screen on its front surface, and (ii) is enclosed within the enclosure apparatus such that the display screen is visible through the see-through portion of the front face of the enclosure apparatus, with the attachment surface securely attached to an inside surface of a window so that the display screen of the tablet computing device is visible through the window.

16 Claims, 5 Drawing Sheets

(56) References Cited

U.S. PATENT DOCUMENTS

| | | | |
|---|---|---|---|
| 2014/0203154 A1* | 7/2014 | Fan | F16M 11/041 248/205.5 |
| 2014/0368993 A1* | 12/2014 | Sun | G06F 1/1656 361/679.55 |
| 2015/0105127 A1* | 4/2015 | Thompson | G06F 1/1628 455/575.8 |

* cited by examiner

DISPLAY SYSTEM USING MOUNTABLE TABLET ENCLOSURE

FIELD OF THE INVENTION

The present invention pertains, among other things, to systems, apparatuses, methods and techniques that are related to the use of tablet computers as display devices and/or that are related to tablet computer enclosures, particularly enclosures that can be mounted to the inside surface of a window.

BACKGROUND

A variety of different display systems exist, including: printed and digital billboards, as well as other types of outdoor signs; printed in-store signs; light-emitting diode (LED) signs; television displays; and wall-mounted liquid crystal displays (LCDs) or plasma displays. However, each such existing display system has its own limitations. In addition, the present inventor has discovered that new display systems can be desirable for additional purposes.

SUMMARY OF THE INVENTION

The present invention therefore provides, among other things, a new type of display system, satisfying a set of needs not currently addressed by existing display systems. One embodiment of the invention is directed to a system for displaying content that includes: (a) an enclosure apparatus having a front face that includes a see-through portion and an attachment surface; and (b) a tablet computing device that (i) has a display screen on its front surface, and (ii) is enclosed within the enclosure apparatus such that the display screen is visible through the see-through portion of the front face of the enclosure apparatus, with the attachment surface securely attached to an inside surface of a window so that the display screen of the tablet computing device is visible through the window.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

Figure 1:
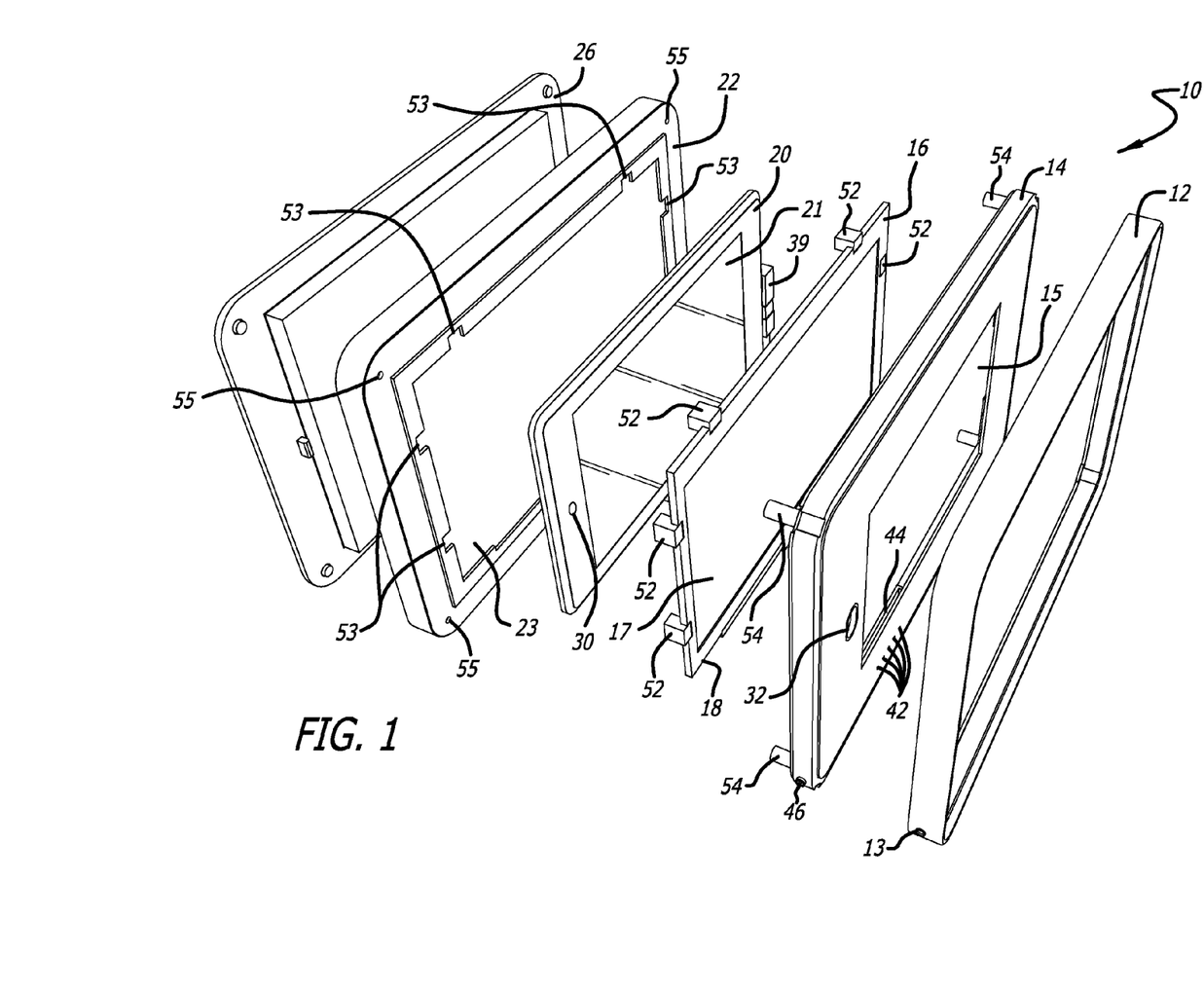
FIG. 1 is an exploded top-right-front perspective view of a display system according to a representative embodiment of the present invention.
Figure 2:
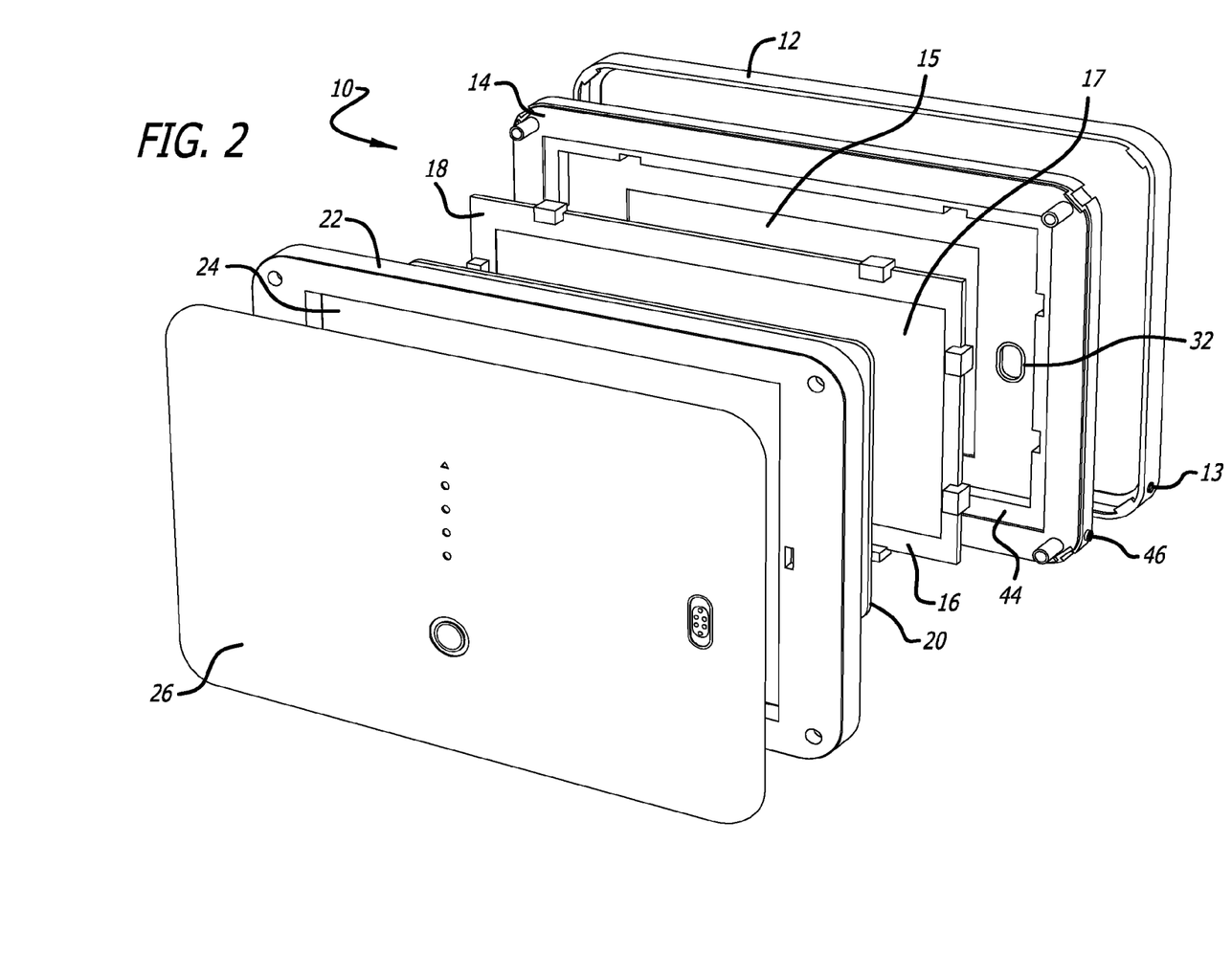
FIG. 2 is an exploded top-right-rear perspective view of the display system shown in FIG. 1.

FIGS. 1 and 2 illustrate the construction of a display system 10 according to a representative embodiment of the present invention. Included in system 10 is, from front to rear: a gasket 12, a front plate 14, an insert piece 16, a tablet computing device 20 (sometimes referred to herein as simply tablet 20), a backing plate 22 and a removable/replaceable battery unit 26. References to the "enclosure apparatus" in connection with the present embodiment refer to the combination of gasket 12, front plate 14, insert piece 16 and backing plate 22.

In the preferred embodiments, gasket 12 is a frame that includes only a peripheral structure, relatively narrow in width, made of polyethylene or any other pliable, resilient and/or rubber-like material (e.g., natural rubber, silicone, thermoplastic rubber, or any other synthetic rubber). In the present embodiment, gasket 12 also includes a side opening 13 (discussed in greater detail below).

Front plate 14 preferably has a more substantial structure than gasket 12, e.g., significantly wider and/or more rigid, although typically similar in width. Included within front plate 14 is a visual opening 15 that preferably is approximately as large as, or larger than, the display screen 21 of tablet 20. As used herein, the expression "visual opening" refers to any see-through area, which can be completely open or, e.g., can be occupied by a glass or plastic plate; and "see-through" refers to anything that is transparent, translucent, or otherwise significantly transmissive of visible light, particularly anything that substantially maintains the amplitude and phase relationships among incoming visible light waves so that usable images can be recovered.

Typically, front plate 14 is made primarily of plastic, any other synthetic polymer, metal and/or a composite material. In the current embodiment, the visual opening 15 is completely open (e.g., so that air can pass through it). In addition, the front surface of front plate 14 includes five smaller openings 42 (although any other number of one or more openings 42 instead may be used) which open to a sealed compartment 44 in the rear of the front plate 14. Within compartment 44 is a valve 45 (shown schematically in FIG. 3) that connects the interior space of compartment 44 to an external port 46 (discussed in greater detail below).

Insert piece 16 preferably includes a visual opening 17, preferably also approximately as large as (or larger than) the display portion 21 of tablet 20. In the present embodiment, visual opening 17 is occupied by a sheet of glass, plastic or other transparent material and is surrounded by a border portion 18, which preferably is made of a pliable, resilient and/or rubber-like material.

Tablet 20 preferably is a conventional tablet computing device (e.g., Android, Apple or Windows-based), with one or more computer processors, internal memory, and wireless network capability (e.g., for communicating over Wi-Fi and/or cellular-based networks). In addition, tablet 20 includes a display screen 21 which preferably has a diagonal length of at least 8 inches and, more preferably, at least 9, 10, 12 or 14 inches. Still further, in the preferred embodiments, tablet 20 includes a front camera 30, and tablet 20 is configured for receiving, recording and processing video received by camera 30. In the current embodiment, through visual opening 17 in insert piece 16 and through a separate visual opening 32 in front plate 14, camera 30 is able to receive images when tablet 20 is fully enclosed within the enclosure apparatus.

Backing plate 22 preferably is a solid piece (e.g., made primarily of plastic, any other synthetic polymer, metal and/or a composite material), with a front recessed portion 23 for accommodating tablet 20 and a rear recessed portion 24 for accommodating battery unit 26. In the preferred embodiments, battery unit 26 includes a plurality of rechargeable lithium-polymer (LiPo) cells, although lithium-ion (Li-ion) or other kinds of rechargeable or non-rechargeable cells instead may be used. In the present embodiment, when battery unit 26 is fitted together with backing plate 22, a spring-loaded movable latch 35 on battery unit 26 engages with recess 36 on backing plate 22 to lock battery unit 26 in place. To subsequently remove battery unit 26, a user slides member 37 (which is operatively attached to latch 35), thereby clearing latch 35 from an inner surface of recess 36 and allowing battery unit 26 to be separated from backing plate 22. However, any other type of attachment mechanism (such as a bracket), e.g., that is part of or otherwise attaches to backing plate 22, instead may be used to removably attach a battery unit 26. Still further, in alternate embodiments a removable battery unit can instead (or also) attach to any other portion of the enclosure apparatus.

In addition to battery unit 26 physically attaching to backing plate 22 in the present embodiment, an electrical coupler 39 also is provided for carrying power from the battery unit 26, through the backing plate 22, to the power input of the tablet computing device 20. This electrical coupler 39 can be in the form of a rigid adapter that attaches at one end to an electrical port 40 on battery unit 26, passes through an opening 41 in backing plate 22, and then attaches at the other end to tablet 20. Alternatively, electrical coupler 39 can be in the form of a flexible cable that performs the same function. Still further, electrical coupler 39 can comprise, e.g., a conductive path through backing plate 22 (i.e., integrally part of backing plate 22), so that backing plate 22 includes an electrical port on its front side that engages with the power input of the tablet 20 and another electrical port on the rear side that engages with the power output of battery unit 26.

In the present embodiment, system 10 is assembled as follows. First, gasket 12 is stretched slightly and then installed around the periphery of front plate 14, so that opening 13 aligns with port 46. Upon doing so, the natural resilient tendency of gasket 12 keeps it securely attached to front plate 14 and forms an airtight seal with it. Tablet 20 is placed within recess 23 of backing plate 22. Insert piece 16 is placed on top of tablet 20, with guide elements 52 fitting within notches 53. Front plate 14 (with gasket 12 attached) is placed on top of insert piece 16, and screws are inserted through holes 55 in backing plate 22 and threaded into female receptacles 54 in front plate 14, thereby securing tablet 20 within the enclosure apparatus. At this point, battery unit 26 can be attached to or detached from backing plate 22 whenever desired, as discussed in greater detail above.

Figure 3:
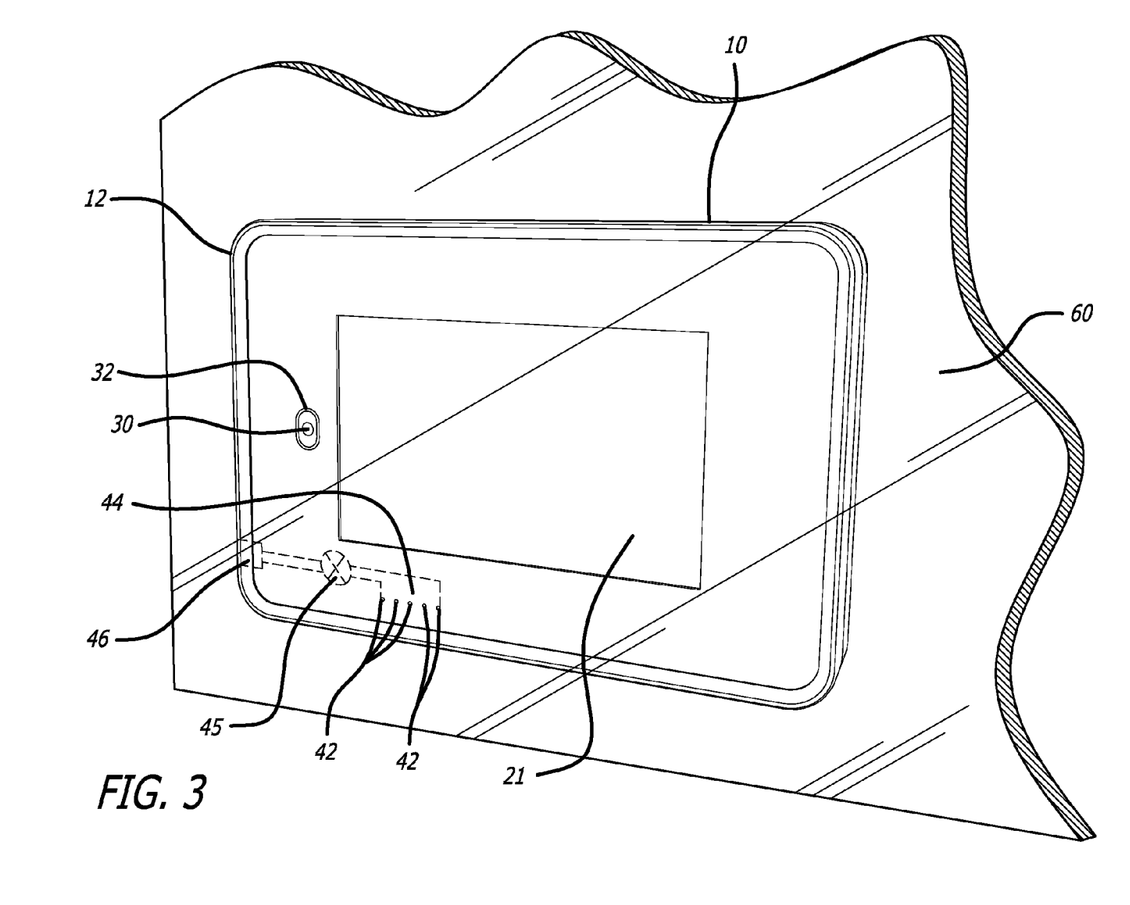
FIG. 3 is a perspective view of the display system shown in FIG. 1, fully assembled and attached to the inside surface of a window.

Once assembled (e.g., in the foregoing manner), display system 10 is ready for use. A vacuum pump (e.g., electric or hand-operated) is attached to the valve 45 through external port 46 (and through opening 13); display system 10 is pressed against the inside surface of a window 60 (e.g., as shown in FIG. 3), thereby creating a substantially airtight seal between gasket 12 and window 60 and resulting in a space enclosed by window 60, gasket 12 and other components of the enclosure assembly; and the attached pump is operated to remove air from that space. The resulting air-pressure differential causes display system 10 to be securely attached to the inner surface of the window 60. Then, the air pump can be detached.

As result of this attachment, people on the other side (i.e., the outside) of window 60 can view display screen 21 of tablet computing device 20. At the same time, front-facing camera 30 is able to create still and/or moving images of those people (by looking through visual openings 17 and 32). Those images preferably are then processed, e.g., either within tablet computing device 20 itself or within another device (such as server 120 discussed below), after having been transmitted to such other device by tablet 20. In the preferred embodiments, such processing is used in order to identify gestures signifying specific inputs and/or to obtain any other desired information (e.g., gender, age, type of dress, level of interest on an instantaneous basis) regarding the people viewing the display screen 21 or any other people within the field of view of camera 30 (e.g., any other people accompanying the individual who is viewing display screen 21, such as to determine whether such individual has children or a spouse with her). The foregoing information preferably then is used to tailor the content that is presented by tablet 20 (e.g., using previously gathered information regarding messages that are most effective with respect to people having particular perceived characteristics).

In addition, or instead, in certain embodiments of the present invention, people viewing content on the tablet 20 have other ways of interacting with it. For example, such people might interact with tablet 20 using their own tablets, smart phones or other portable computing devices, or using their wireless headset to send and/or receive audio communications to/from tablet 20, in either case using Bluetooth, near-field RF communications or any other wireless technologies.

The foregoing structure of display system 10 provides several advantageous maintenance and other features. First, as noted above, battery unit 26 can be easily removed and replaced while display system 10 remains attached to the window 60 and while tablet 20 continues to operate, and without interfering with any other aspects of display system 10. The use of a hot-swappable extended battery unit 26 can provide not only longer operating time (e.g., 24 hours or more), but also can allow indefinite operation with just quick periodic battery changes. Second, display system 10 can be configured so as to be resistant to theft. Specifically, in order to remove display system 10 from window 60, it typically is necessary to open the valve 45. By recessing valve 45 within compartment 44 and/or appropriately configuring the valve-release mechanism, opening valve 45 can require the use of a specific tool (e.g., one that is not readily available). In certain embodiments, further measures also are taken to secure display system 10, such as using a lock to control access to compartment 44.

The foregoing discussion concerns one specific embodiment of a display system according to the present invention. In this embodiment, gasket 12 provides the attachment surface for securing the entire display device 10 to a window 60. However, in alternate embodiments, other attachment surfaces are provided. For instance, gasket 72 (shown in FIG. 4) has a wider contact surface area 73, which sometimes can provide a better seal, allowing less ambient air to leak in. Gasket 72 can be used by itself to secure the display device 70 to the window 60 (using the air-pressure differential alone, as discussed above), or matching adhesive frame 74 (e.g., with both sides coated with adhesive material) can be attached to gasket 72 and used to secure display system 70 to the window

Figure 4:
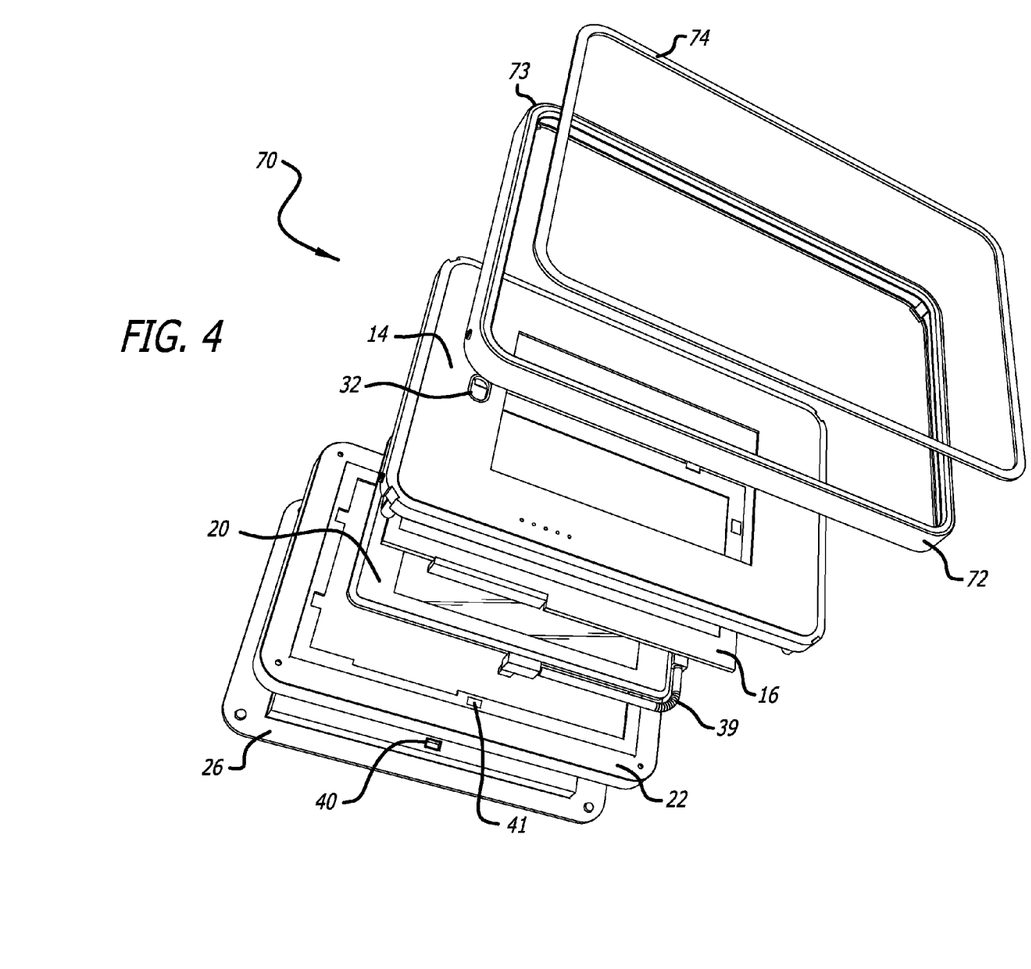
FIG. 4 is an exploded bottom-right-front perspective view of a display system according to a representative embodiment of the present invention.

60. In the latter case, the attachment surface is provided by adhesive frame 74, so that the adhesive material, e.g., in conjunction with the air-pressure differential, is used to secure display system 10 to window 60). As shown in FIG. 4, other than the replacement of gasket 12 with gasket 72 and/or adhesive frame 74, display system 70 is identical to display system 10.

Figure 5A:
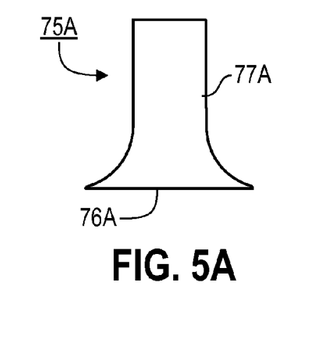
FIGS. 5A-C are sectional views of a single edge of three different frame-shaped gaskets according to the present invention.
Figure 5B:
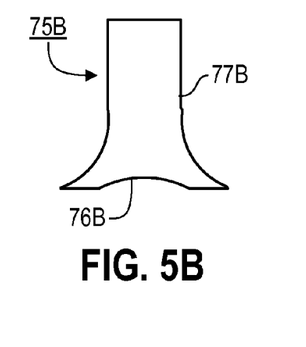
Figure 5C:
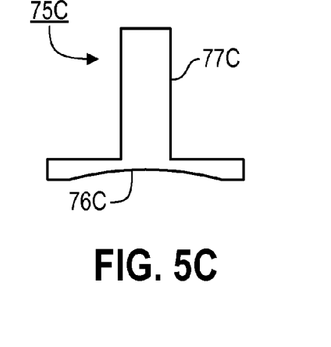

In certain embodiments, particularly those where air pressure alone is used to secure display device 10 to the window 60, the minimum width of the contact surface area is ⅛ inch, ¼ inch or ½ inch. Such a contact surface width can be provided by making the entire frame 72 that wide or, alternatively, with reference to FIGS. 5A-C, by using a frame-shaped gasket 75A-C, respectively, having a front surface 76A-C (which makes contact with the window 60) wider than its main body 77A-C (which attaches to front plate 14). In certain embodiments, a substantially flat front surface 76A is used (as shown in FIG. 5A), while in others a somewhat concave front surface 76B or 76C is used (as shown in FIGS. 5A&B, respectively), e.g., analogous to a conventional suction cup. In any event, it often will be preferable for the front surface 76A-C to be relatively thin (e.g., less than approximately 2-4 mm) in at least some of its portions, so that it can easily conform itself to the surface of the window 60.

Still further, any of a variety of different attachment surfaces instead may be used. For example, plural conventional suction cups can be used to attach a display system according to the present invention at corresponding discrete points on the window 60. However, an attachment frame (e.g., gasket 12 or 72) around the provided see-through portion of the enclosure apparatus's front face (although not necessarily around the entire front plate 14 or other type of front component) currently is believed to provide the best combination of aesthetics and functionality.

One aspect of the present invention is to provide a tablet computing device 20 within an enclosure apparatus, which in turn is attached to the inside surface of a window 60, such that the tablet's display screen 21 is visible through a see-through portion of the front face of the enclosure apparatus. In the embodiments described above, this see-through portion is comprised of opening 15 in the front plate 14 and opening 17 in insert piece 16. By occupying visual opening 17 with glass or another transparent material and forming the periphery of insert piece 16 of a pliable, resilient and/or rubber-like material, the low-pressure space (which holds display system 10 or 70 to window 60) is disposed between insert piece 16 and window 60, thereby isolating tablet 20 from the corresponding pressure. However, any of a variety of other configurations is possible, including configurations in which tablet 20 is disposed within the low-pressure space (e.g., using a rigid enclosure structure that isolates tablet 20 from such pressures).

Similarly, in other embodiments, a quick-release bracket or other attachment mechanism is used to allow tablet 20 to be easily detached from and reattached to the enclosure apparatus (e.g., similar to how battery unit 26 can be detached and reattached in the preceding embodiments). Still further, in such alternate embodiments either or both of the actuation member 37 for removing battery unit 26 or the corresponding actuation member for removing tablet 20 can be secured (e.g., key-operated or disposed behind a locking mechanism) in order to further enhance the anti-theft properties of the display device. In addition, or instead, anti-theft software can be incorporated into tablet 20, including, e.g., software for generating an audible alarm and/or transmitting an alarm signal (which can include GPS location information) to server 120 if the tablet 20's sensors (which can include camera 30, as well as various position sensors) detect rotation, acceleration and/or movement beyond a specified threshold amount.

Visual opening 32 for camera 30 and/or any other visual openings used by camera 30 within the enclosure apparatus typically will be either completely open or will be occupied by a flat plane of glass or other transparent sheet material. However, any such opening instead can be occupied by an optical system, e.g., for zooming, shifting the optical center point and/or focusing. In addition, in certain embodiments this optical system is electronically controlled, with the control circuit being coupled to the data port on the tablet computing device 20 so that tablet 20 can instruct (either directly through its internal software or as a conduit for instructions provided by server 120), e.g., when and how to zoom, shift the optical center point and/or focus.

Figure 6:
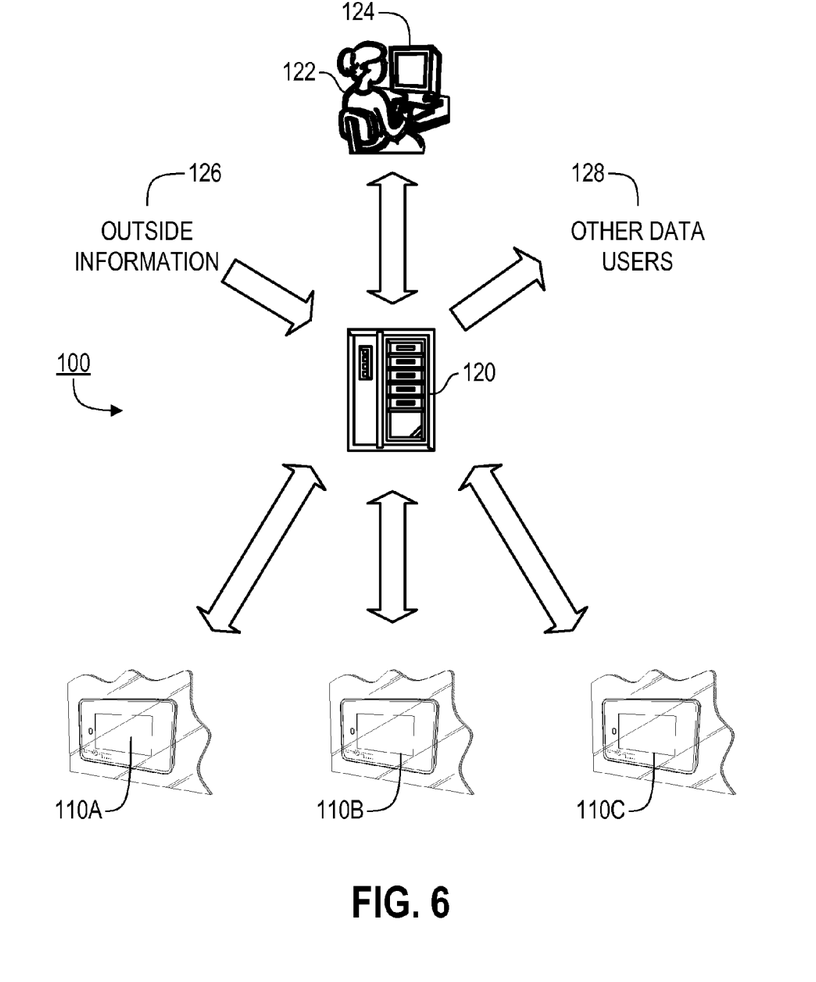
FIG. 6 is a block diagram showing a display network according to a representative embodiment of the present invention.

The foregoing discussion primarily focuses on a single display device. However, referring to FIG. 6, the present invention also encompasses a network 100 of geographically dispersed display devices 110A-C (individually referred to as a display device 110), any one of which could be, e.g., display device 10 or display device 70. Although (for ease of illustration) only three display devices 110 are shown in FIG. 6, network 100 typically will include at least 10, 100 or 1,000 such display devices 110, dispersed throughout a city, county, state, nation, or even the world. As shown, in the present embodiment each such display device 110 communicates with a central server 120, e.g., using a wireless network and the Internet. In this way, each such display device 110 can be updated in real time with new content, new software for specifying when and how to deliver such content and for otherwise controlling the corresponding tablet 20, and new data (e.g., customer-type profile information) for use in conjunction with such software. At the same time, information received by the tablet 20 preferably is uploaded to server 120 for analysis, e.g., in order to further optimize its display and/or interaction algorithms and/or for provision to other parties 128 that might be able to use it.

In the preferred embodiments, each display device 110 is configured in a customized way based on its location and purpose. For instance, display device 110A might be located in a window of a suburban store and might be used primarily to promote sales within that store, while display device 110B is used in the window of an urban restaurant and is used to deliver news and promote a variety of businesses and activities within the city.

One or more administrators 122 program, maintain and configure server 120, e.g., communicating with server 120 through a separate computer 124. In connection with these activities, outside sources 126 (e.g., advertisers or commercial databases) typically will provide content and/or information to server 120. In addition, information obtained and/or generated by server 120 (e.g., through the display devices 110) may be provided to third parties 128 who have a use for it.

System Environment.

Generally speaking, except where clearly indicated otherwise, all of the computerized systems, methods, functionality and techniques described herein can be practiced with the use of one or more programmable general-purpose computing devices. Such devices (e.g., including any of the electronic devices mentioned herein) typically will include, for example, at least some of the following components coupled to each other, e.g., via a common bus: (1) one or more central processing units (CPUs); (2) read-only memory (ROM); (3) random access memory (RAM); (4) input/output software and circuitry for interfacing with other devices (e.g., using a hardwired connection, such as a serial port, a parallel port, a USB connection or a FireWire connection, or using a wireless protocol, such as radio-frequency identification (RFID), any other near-field communication (NFC) protocol, Bluetooth or a 802.11 protocol); (5) software and circuitry for connecting to one or more networks, e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system, which networks, in turn, in many embodiments of the invention, connect to the Internet or to any other networks; (6) a display (such as a cathode ray tube display, a liquid crystal display, an organic light-emitting display, a polymeric light-emitting display or any other thin-film display); (7) other output devices (such as one or more speakers, a headphone set and/or a printer); (8) one or more input devices (such as a mouse, touchpad, tablet, touch-sensitive display or other pointing device, a keyboard, a keypad, a microphone and/or a scanner); (9) a mass storage unit (such as a hard disk drive or a solid-state drive); (10) a real-time clock; (11) a removable storage read/write device (such as a flash drive, any other portable drive that utilizes semiconductor memory, a magnetic disk, a magnetic tape, an opto-magnetic disk, an optical disk, or the like); and/or (12) a modem (e.g., for sending faxes or for connecting to the Internet or to any other computer network). In operation, the process steps to implement the above methods and functionality, to the extent performed by such a general-purpose computer, typically initially are stored in mass storage (e.g., a hard disk or solid-state drive), are downloaded into RAM, and then are executed by the CPU out of RAM. However, in some cases the process steps initially are stored in RAM or ROM and/or are directly executed out of mass storage.

Suitable general-purpose programmable devices for use in implementing the present invention may be obtained from various vendors. In the various embodiments, different types of devices are used depending upon the size and complexity of the tasks. Such devices can include, e.g., mainframe computers, multiprocessor computers, one or more server boxes, workstations, personal (e.g., desktop, laptop, tablet or slate) computers and/or even smaller computers, such as personal digital assistants (PDAs), wireless telephones (e.g., smartphones) or any other programmable appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented by a general-purpose processor executing software and/or firmware, by dedicated (e.g., logic-based) hardware, or any combination of these approaches, with the particular implementation being selected based on known engineering tradeoffs. More specifically, where any process and/or functionality described above is implemented in a fixed, predetermined and/or logical manner, it can be accomplished by a processor executing programming (e.g., software or firmware), an appropriate arrangement of logic components (hardware), or any combination of the two, as will be readily appreciated by those skilled in the art. In other words, it is well-understood how to convert logical and/or arithmetic operations into instructions for performing such operations within a processor and/or into logic gate configurations for performing such operations; in fact, compilers typically are available for both kinds of conversions.

It should be understood that the present invention also relates to machine-readable tangible (or non-transitory) media on which are stored software or firmware program instructions (i.e., computer-executable process instructions) for performing the methods and functionality of this invention. Such media include, by way of example, magnetic disks, magnetic tape, optically readable media such as CDs and DVDs, or semiconductor memory such as various types of memory cards, USB flash memory devices, solid-state drives, etc. In each case, the medium may take the form of a portable item such as a miniature disk drive or a small disk, diskette, cassette, cartridge, card, stick etc., or it may take the form of a relatively larger or less-mobile item such as a hard disk drive, ROM or RAM provided in a computer or other device. As used herein, unless clearly noted otherwise, references to computer-executable process steps stored on a computer-readable or machine-readable medium are intended to encompass situations in which such process steps are stored on a single medium, as well as situations in which such process steps are stored across multiple media.

The foregoing description primarily emphasizes electronic computers and devices. However, it should be understood that any other computing or other type of device instead may be used, such as a device utilizing any combination of electronic, optical, biological and chemical processing that is capable of performing basic logical and/or arithmetic operations.

In addition, where the present disclosure refers to a processor, computer, server, server device, computer-readable medium or other storage device, client device, or any other kind of apparatus or device, such references should be understood as encompassing the use of plural such processors, computers, servers, server devices, computer-readable media or other storage devices, client devices, or any other such apparatuses or devices, except to the extent clearly indicated otherwise. For instance, a server generally can (and often will) be implemented using a single device or a cluster of server devices (either local or geographically dispersed), e.g., with appropriate load balancing. Similarly, a server device and a client device often will cooperate in executing the process steps of a complete method, e.g., with each such device having its own storage device(s) storing a portion of such process steps and its own processor(s) executing those process steps.

As used herein, the term "coupled", or any other form of the word, is intended to mean either directly connected or connected through one or more other elements or processing blocks.

Additional Considerations.

In the above discussion, certain methods are explained by breaking them down into steps listed in a particular order. However, it should be noted that in each such case, except to the extent clearly indicated to the contrary or mandated by practical considerations (such as where the results from one step are necessary to perform another), the indicated order is not critical but, instead, that the described steps can be reordered and/or two or more of such steps can be performed concurrently.

References herein to a "criterion", "multiple criteria", "condition", "conditions" or similar words which are intended to trigger, limit, filter or otherwise affect processing steps, other actions, the subjects of processing steps or actions, or any other activity or data, are intended to mean "one or more", irrespective of whether the singular or the plural form has been used. For instance, any criterion or condition can include any combination (e.g., Boolean combination) of actions, events and/or occurrences (i.e., a multipart criterion or condition).

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

In the discussions above, the words "include", "includes", "including", and all other forms of the word should not be understood as limiting, but rather any specific items following such words should be understood as being merely exemplary.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A system for displaying content, comprising:
   (a) an enclosure apparatus having a front face that includes a see-through portion and an attachment surface; and
   (b) a tablet computing device that (i) has a display screen on its front surface, and (ii) is enclosed within the enclosure apparatus such that the display screen is visible through the see-through portion of the front face of the enclosure apparatus,
   wherein the attachment surface is securely attached to an inside surface of a window so that the display screen of the tablet computing device is visible through the window,
   wherein the attachment surface comprises a frame that completely surrounds the see-through portion of the front face of the enclosure apparatus,
   wherein the frame is securely attached to the inside surface of the window solely through the use of an air-pressure differential, and
   wherein the enclosure apparatus includes a valve for attaching an external pump to evacuate air from a space enclosed by the frame when the frame is pressed against the window.

2. A system according to claim 1, wherein the enclosure apparatus includes a front-face component that has a peripheral structure defining a central visual opening, wherein the central visual opening forms at least a part of the see-through portion of the front face, and wherein the frame resiliently fits around a peripheral edge of the front-face component.

3. A system according to claim 2, further comprising an insert piece, disposed between the front-face component and a tablet computing device, that includes a flexible and resilient peripheral structure surrounding a second visual opening that also forms a part of the see-through portion of the front face of the enclosure apparatus.

4. A system according to claim 1, wherein the enclosure apparatus includes an attachment mechanism that is configured to removably attach and detach a battery unit, and further comprising an electrical coupler that carries power from the battery unit to a power input of the tablet computing device.

5. A system according to claim 1, wherein the tablet computing device communicates, through a wireless network, with a central server that controls operation of the tablet computing device.

6. A system according to claim 5, further comprising a plurality of additional units, each comprising a said tablet computing device enclosed within a said enclosure apparatus, and wherein the central server communicates with and controls operation of each said tablet computing device.

7. A system according to claim 1, wherein the tablet computing device includes a front-facing camera, and wherein the enclosure apparatus includes a visual opening that permits the camera to receive visual images through the window.

8. A system for displaying content, comprising:
   (a) an enclosure apparatus having a front face that includes a see-through portion and an attachment surface; and
   (b) a tablet computing device that (i) has a display screen on its front surface, and (ii) is enclosed within the enclosure apparatus such that the display screen is visible through the see-through portion of the front face of the enclosure apparatus,
   wherein the attachment surface is securely attached to an inside surface of a window so that the display screen of the tablet computing device is visible through the window,
   wherein the enclosure apparatus includes an attachment mechanism that is configured to removably attach and detach a battery unit, and further comprising an electrical coupler that carries power from the battery unit to a power input of the tablet computing device, and
   wherein the attachment mechanism is attached to a backing plate disposed behind the tablet computing device that cooperates with other components of the enclosure apparatus to completely enclose the tablet computing device even when the battery unit is removed.

9. A system according to claim 8, wherein the attachment surface comprises a frame that completely surrounds the see-through portion of the front face of the enclosure apparatus.

10. A system according to claim 9, wherein the frame is securely attached to the inside surface of the window solely through the use of an air-pressure differential.

11. A system according to claim 10, wherein the enclosure apparatus includes a valve for attaching an external pump to evacuate air from a space enclosed by the frame when the frame is pressed against the window.

12. A system according to claim 8, wherein the enclosure apparatus includes a front-face component that has a peripheral structure defining a central visual opening, wherein the central visual opening forms at least a part of the see-through portion of the front face, and wherein the frame resiliently fits around a peripheral edge of the front-face component.

13. A system according to claim 12, further comprising an insert piece, disposed between the front-face component and a tablet computing device, that includes a flexible and resilient peripheral structure surrounding a second visual opening that also forms a part of the see-through portion of the front face of the enclosure apparatus.

14. A system according to claim 8, wherein the tablet computing device communicates, through a wireless network, with a central server that controls operation of the tablet computing device.

15. A system according to claim 14, further comprising a plurality of additional units, each comprising a said tablet computing device enclosed within a said enclosure apparatus, and wherein the central server communicates with and controls operation of each said tablet computing device.

16. A system according to claim 8, wherein the tablet computing device includes a front-facing camera, and wherein the enclosure apparatus includes a visual opening that permits the camera to receive visual images through the window.

* * * * *